June 22, 1926.
O. CREED
1,589,514
FILLING ATTACHMENT FOR FUEL TANKS
Filed Nov. 14, 1923
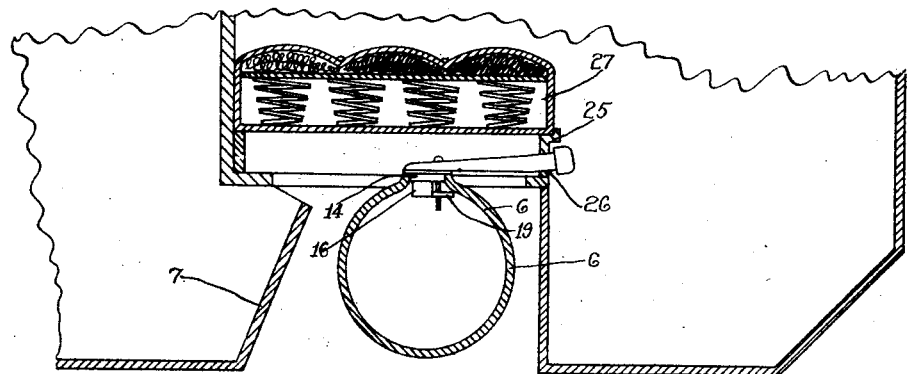
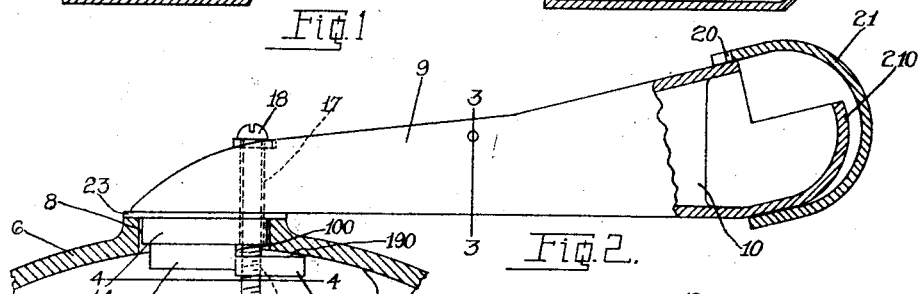
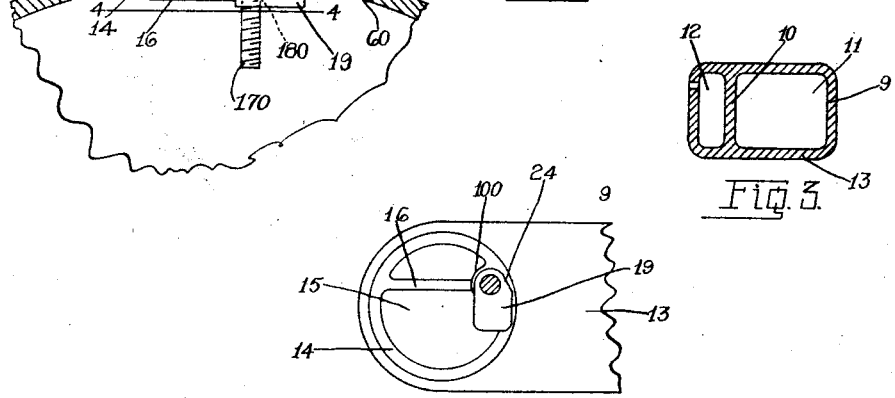
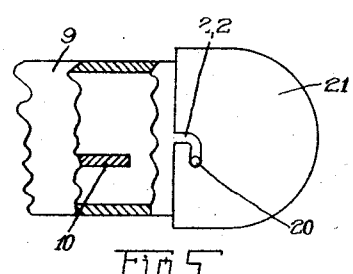
Inventor
OLIVER CREED.
By Walter F. Murray
Attorney Patented June 22, 1926.

1,589,514

UNITED STATES PATENT OFFICE.

OLIVER CREED, OF CINCINNATI, OHIO.

FILLING ATTACHMENT FOR FUEL TANKS.

Application filed November 14, 1923. Serial No. 674,753.

An object of my invention is to provide a tank filling attachment that may be mounted upon the tank of an automobile and which will extend through the edge of the seat through which fuel may be directed at any rate of flow without causing the ejection of the fuel from the mouth of the filler.

Another object of my invention is to provide a device of this character which may be readily attached to and detached from the tank.

Another object is to provide a device which is simple and efficient of operation and which requires a minimum of labor for its production and installation.

These and other objects are attained by the means described herein, and disclosed in in the accompanying drawings, in which:

Fig. 1 is a fragmental longitudinal cross sectional view of an automobile having mounted on its chassis a tank and a tank filling device of my invention.

Fig. 2 is an elevational side view of a device of my invention parts being broken away.

Fig. 3 is a cross sectional view on line 3—3 of Fig. 2.

Fig. 4 is a view taken on line 4—4 of Fig. 2 except that the securing means is shown in an inoperative position.

Fig. 5 is a detail of the cap of my invention.

The tank 6 is mounted upon an automobile 7 beneath the seat thereof and may be of any desired form having formed in its upper portion a port 8. The filling device comprises a casing 9 having an interior wall 10 extending in a direction of its length for dividing it into two passages 11 and 12. The bottom wall 13 of the casing 9 may be substantially flat and carries at its one end an annular flange 14 of substantially the same diameter as the port 8 in the tank and which is adapted to slidingly engage therein. The interior wall 10 in the casing 9 extends through the opening 15 which is surrounded by the annular flange 14, the projection 16 of the wall 10 being substantially narrower than the opening 15. The interior wall 10 carries a transverse bore 17 through which extends the bolt 18. Threadedly mounted on the lower end of the bolt 18 adjacent the annular flange 14 is a securing lug 19 which is adapted to be inserted through the port 8 in the tank 6 and to be then turned so that the upper face 190 of the lug 19 will engage the inner face 60 of the tank 6 adjacent the port 8. The casing 9 is developed at its other end into a substantially round cup or cupped flange 210. Adjacent the top edge of the casing 9 is mounted a pin 20. A suitable cap 21 is provided with a bayonet slot 22 which may engage pin 20 for locking the cap upon the end of the casing.

In operation the lug 19 is turned to a position to lie within the walls of the annular flange 14 whereupon the lug 19 and annular flange 14 are inserted through the port 8 in the tank 6. The lug 19 is adjusted on the bolt 18 so that it will not frictionally bind upon the annular flange 14. After the device is thus inserted, a suitable gasket 23 being used if desired, the bolt 18 is turned in a clockwise direction to tighten it upon the lug whereupon the lug 19 will revolve with the bolt 18 until the shoulder 24 of the lug 19 engages the edge 100 of the projection 16 on the wall 10 whereupon further tightening of the bolt will frictionally bind the lug 19 against the inner face 60 of the tank wall thus securing the wall of the tank 6 between the bottom 13 of the casing 9 and the top face 190 of the lug 19. The device now being secured upon the tank with the cap 21 extending thru a suitable bore 26 in the forward wall 25 of the seat structure, the tank may be filled without removing the cushion 27. The device is of sufficient length to allow the filling end and the pin to extend beyond the body line of the seat. The locking operation of the cap with the bayonet slot 22 upon the pin 20 is of ordinary application and needs no further explanation. It will be observed that the mounting of the filler upon the tank is expeditiously accomplished without the use of tools other than a screw driver for tightening the bolt 18. In removing the device it is necessary to remove the seat to have access to the filler. To disengage the lug 19 from engagement upon the inner wall of the tank 6, it is necessary only to turn the bolt 18 with a screw driver whereupon the bolt will unscrew in the threaded bore 180 in the lug 19 and as the lug is lowered upon the bolt 18 sufficiently to clear the inner wall of the tank 6 it will turn to the inoperative position as shown in Fig. 4 whereupon the filler may be removed from the tank. The simple operation of the securing lug on the bolt is due to the fact that the slight frictional engagement of the threaded bore 180 in the lug upon the threads 170 of the bolt is sufficient to cause the lug to be carried with the bolt as it is turning when there is no other frictional engagement upon the lug. However, in turning the lug to the operative position the turning of the bolt will carry the lug 19 to the position shown in Fig. 2 whereupon the shoulder 24 of the lug 19 engages upon the edge 100 of the projected portion of the wall 10 thus retaining the lug in the operative position until further turning of the screw causing the clamping engagement of the wall of the tank between the upper face of the lug and the lower wall 13 of the casing as has been heretofore described. A suitable folding gauge is used to insert through the passage 11 into the tank for determining the extent of the contents thereof. In filling a tank with a device of my invention it is necessary only to turn the cap 21 to the left and pull it from the casing. The nozzle of the filling hose from the supply tank is inserted well into the passage 11 substantially in the direction of its length, whereupon the fluid may be run into the device at any rate of speed, the necessary exhausting of air from the tank taking place through the passage 12 in the device. The cuplike portion 210 on the filling end of the device eliminates spilling of any of the fluid when the hose is removed, and makes it possible to drain the supply hose by turning the nozzle thereof to a vertical position in the cup 210 of the filler.

Attention is called to the formation of the discharge end of the casing 9, whereby the fluid directed thru the passage 11 under pressure from the filler nozzle is deflected into the tank without congesting the fluid at the turn in said passage, wherefore the fluid does not run and is not splashed out of the mouth of the passage 11.

What I claim is:

1. In a device of the class described the combination of a casing, a cup on one end of the casing, a wall within the casing for forming two passages through the casing, one of said passages being suitable for receiving the end of a nozzle in substantially the direction of its length adjacent the cup and without constriction of the other of said passages, a cap for effecting a closure for the cup end of the casing, means for locking the cap on the casing and means for mounting the casing upon a tank.

2. As a new article of manufacture a filler casing having two passages extending through the casing, a cup at one end of the casing communicating with the passages therein, the walls of one of said passages being spaced for receiving between them a nozzle of a filling hose in substantially longitudinal alignment with said walls without constriction of the other of said passages, and means to mount the other end of the casing over a port in a tank.

3. In a device of the class described the combination of a casing having openings at its opposite ends and a pair of passages extending between the openings, the one end of the casing having a cup formed on it, the cup draining into one of said passages and communicating with both of said passages, the cup being open at its top for receiving a nozzle that may be inserted into one of said passages without constriction of the other of said passages.

4. In a device of the class described the combination of a casing having openings at its opposite ends and a pair of passages extending between the openings, the one end of the casing being turned upwardly for providing a cup at said one end of the casing, the cup being open at its top for receiving a nozzle that may be inserted into one of said passages without constriction of the other of said passages, and a cap for detachable mounting on the casing for effecting a closure at the top of the cup for sealing the passages at the said one end of the casing.

5. In a device of the class described the combination of a casing having a bore extending longitudinally therethrough, a partition wall extending longitudinally of the casing and dividing the bore into a pair of passages, one of said passages being adapted to receive a nozzle without constriction of the second passage, and means for sealing both passages at the end of the casing arranged for receiving a nozzle.

6. A tank filler comprising a casing having two passages therethrough, one passage having a single bend therein, the casing being formed to effect a gradual change of direction of said passage, the casing also having an open end for the reception of a nozzle for directing fluid under pressure into the passage remote from the bend in the passage, and directed toward said bend, the gradual change in direction of the passage serving to deflect the fluid without returning any portion thereof to the nozzle, the second passage serving as an air vent, and the passages being so related that insertion of a filling nozzle in the passage, adapted for receiving fluid from a nozzle, will not constrict the second or air vent passage.

In testimony whereof, I have hereunto subscribed my name this 6th day of November, 1923.

OLIVER CREED.